United States Patent
Goldstein et al.

[11] 3,899,676
[45] Aug. 12, 1975

[54] APPARATUS FOR POWER AND BREEDING DISTRIBUTION MEASUREMENTS IN BREEDER REACTORS

[75] Inventors: Norman P. Goldstein; Kuan H. Sun, both of Pittsburgh, Pa.

[73] Assignee: Westinghouse Electric Corporation, Pittsburgh, Pa.

[22] Filed: Feb. 5, 1973

[21] Appl. No.: 329,915

Related U.S. Application Data

[63] Continuation of Ser. No. 88,605, Nov. 12, 1970, Pat. No. T901,026.

[52] U.S. Cl.............................. 250/390; 250/391
[51] Int. Cl............................................. G01t 3/00
[58] Field of Search............... 250/390, 391, 392

[56] References Cited
UNITED STATES PATENTS
3,035,173   5/1973   Miramond et al. ............... 250/390
3,711,714   1/1973   Klar et al. ........................ 250/390

*Primary Examiner*—Archie R. Borchelt
*Attorney, Agent, or Firm*—D. C. Abeles

[57] ABSTRACT

A detection system is disclosed herein for the measurement of power and breeding distribution inside a breeder reactor. Small diameter BeO balls comprising oxides of $U^{235}$ and $U^{238}$ are inserted into the reactor for activation and withdrawn to be counted in a Ge(Li) counter. Measurements of the activated fission and $NP^{239}$ gamma rays yield the desired distributions.

14 Claims, 8 Drawing Figures

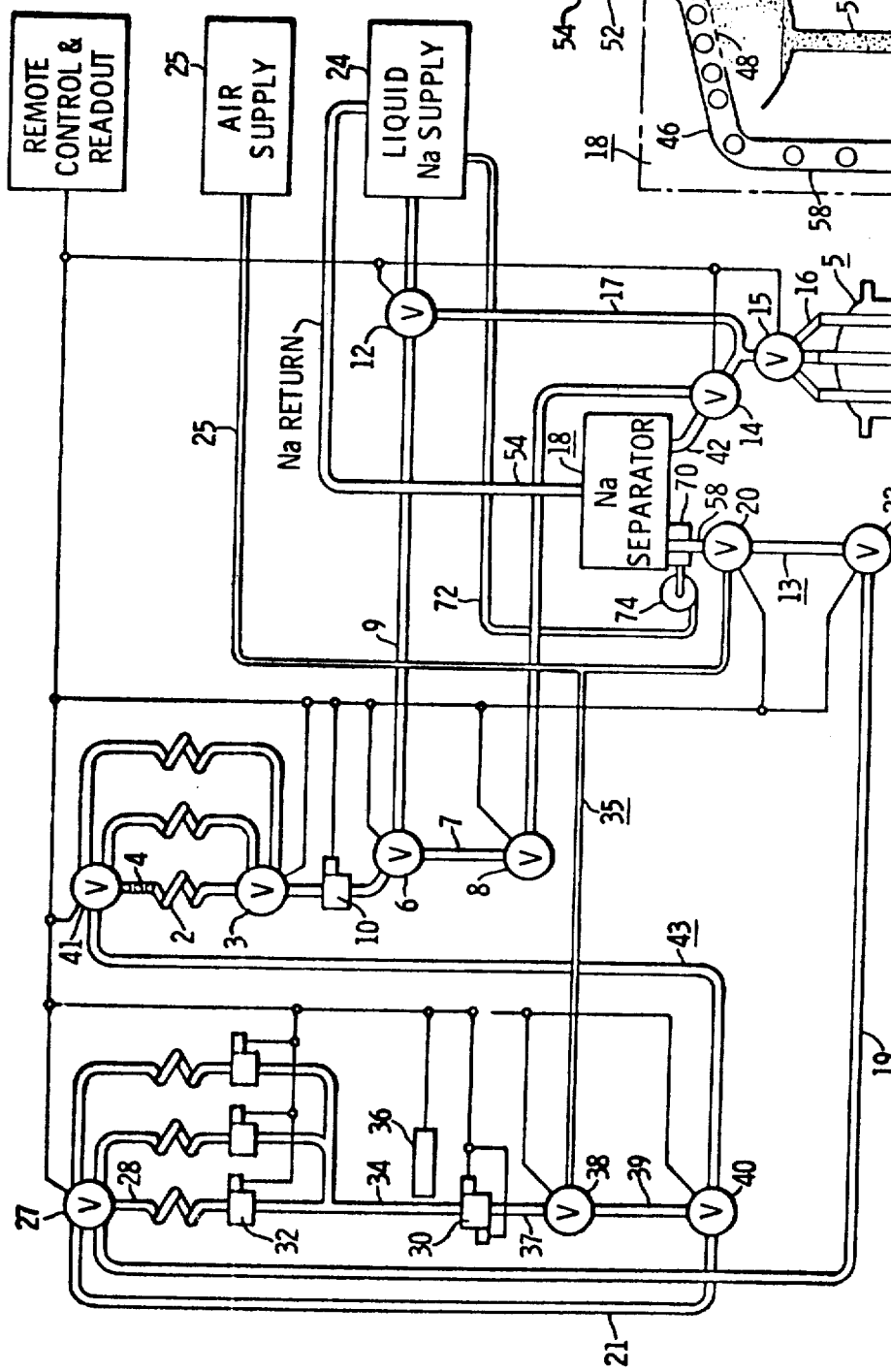
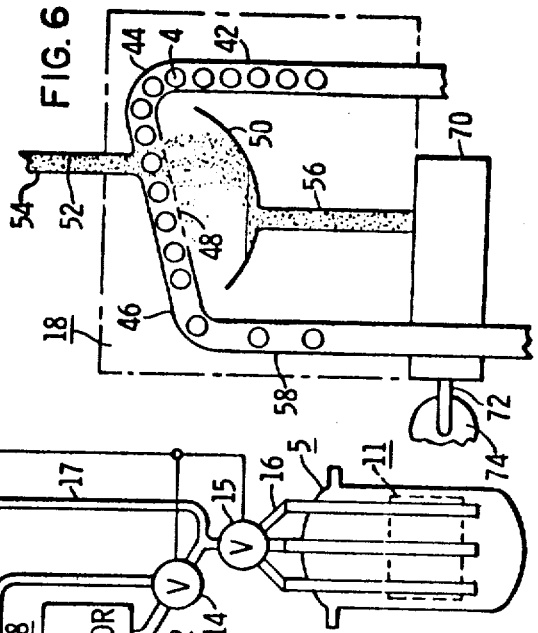
FIG. 5
FIG. 6

APPARATUS FOR POWER AND BREEDING DISTRIBUTION MEASUREMENTS IN BREEDER REACTORS

CROSS-REFERENCE TO RELATED PATENTS

This is a continuation of application Ser. No. 88,605 filed Nov. 12, 1970 now Defensive Publication No. T 901026.

The present invention is an improvement in the invention disclosed in R. A. Wiesemann et al. U.S. Pat. No. 3,263,081, issued July 26, 1966, entitled "Flux Mapping System For Measuring Radiation." The aforementioned patent is assigned to the assignee of the present invention.

BACKGROUND OF THE INVENTION

This invention relates in general to apparatus for measuring the in-core power distribution and fuel breeding rates within fast breeder power reactors, and more specifically, to such apparatus employing detectors that utilize the principle of neutron activation analysis.

For the economical and safe operation of modern and future reactors, it is desirable to measure the in-core power distribution. In the case of a fast breeder reactor, the breeding distribution throughout the reactive core and blankets is also of importance. In practice, information concerning the power distribution is usually derived by measuring the neutron flux. This can be achieved by either using fission ion chamber or activation detectors, both of which have been used in thermal reactors. However, because of the severe environmental operating conditions encountered in a modern, power breeder reactor, no suitable fission ion chamber or activation detector has as yet been developed. Thus, one object of this invention is to provide a suitable activation detector for breeder reactors which will survive its severe embodiment and at the same time yield information concerning the in-core power distribution. In addition, the present invention provides apparatus and a method for measuring fuel breeding. The latter apparatus and method also utilize the principle of neutron activation analysis but with constituents specifically selected for measuring breeding. In this type of analysis an activant, comprising a radiation responsive material is irradiated by neutrons from a neutron source for a known time interval. The activant becomes radioactive upon irradiation and measurement of selective energy levels of this activity, called herein the activity of interest, yields information as to the power distribution and fuel breeding. The detectors of the present invention are formed from a substrate material which provides a solid mechanical structure in which the activant is embedded.

An activation detector for measuring the power distribution and fuel breeding in a fast breeder reactor must necessarily satisfy the following conditions:

1. The activity of interest must be free of interfering radioactivities from the substrate and impurities and must be measurable in a convenient time schedule;

2. The resulting activity must yield an accurate indication of the power and/or breeding in the vicinity of the activation;

3. The size of the detectors must be small enough so that the activation system does not significantly disturb the reactor flux;

4. The detectors must maintain their mechanical integrity under the severe temperature changes within the fast breeder reactor (room temperature up to 300°–1000°C or higher) and high radiation fields (approximately $10^9$ r/hr and approximately $6 \times 10^{15}$ nvt) to which they will be subjected; and 5. It is desirable that the detectors be capable of being used over and over again. This means that the induced radioactivities should decay to a negligible level after a reasonable period of storage.

SUMMARY OF THE INVENTION

In order to meet the aforementioned requirements imposed by the severe environmental conditions within the fast breeder reactor, apparatus has been developed for measuring the in-core power distribution and fuel breeding within fast breeder power reactors which requires only a single activant irradiation. In accordance with this invention, an activant is irradiated by neutrons from a neutron source, such as a fast breeder power reactor, for a known time interval. The activant becomes radioactive upon irradiation and measurement of the activity produced thereby yields outputs representative of the neutron flux and thus the power distribution and fuel breeding. The activant may be placed in different regions of the breeder where these parameters need to be measured.

The detectors of the present invention use, as an activant, a mixture of fissile nuclides, such as $Pu^{239}$, $U^{235}$, $U^{233}$ and $Pu^{241}$ and fertile materials, such as $U^{238}$ or $Th^{232}$. The capture cross-section of these activants varies with the energy of the incoming particles and generally peaks in one or more energy ranges. As may be noted from numerous graphical representations of capture cross-section versus energy, the various activant materials have substantially different capture cross-sections for different energy ranges. The composition of the mixture of activants is chosen so that the energy dependence of its neutron interaction probability simulates as well as possible, that of the fuel. By a simulated neutron interaction probability, it is meant that the capture cross-section of the mixture will have approximately the same statistical probability of capture, at the energy levels of the activity of interest, as that of the fuel. After neutron irradiation, the activity from the fission products produced by the $(n,f,)$ reaction in counted first, counting mostly the delayed gamma rays, which yield information concerning the power distribution in the reactor. A day or so after the activity from the fission products has decayed to a low level, the activity of $Np^{239}$ or $Pa^{233}$ produced by the:

$$U^{238} \; (n,\gamma) \; U^{239} \; \xrightarrow{\beta\gamma} Np^{239} \text{ or}$$

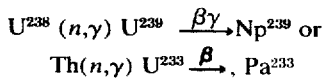

reaction is counted, yielding the desired breeding information. The subject invention also contemplates the use of fissile nuclides or intermediate nuclides, such as $Ni^{64}$ and $Si^{30}$, as activants to measure the power distribution in the reactor; and the use of fertile materials as activants to measure fuel breeding in the reactor.

the detectors of the present invention are desirably shaped in the form of wires or small pellets or beads comprising small amounts of the desired activant isotopes embedded in a substrate material. The substrate is formed from a suitable material which produces low or negligible activities upon neutron irradiation and has good structural strength such as BeO, Cr, niobium or tantalum. A very small amount of a known radioactive material, such as $Cs^{137}$ may be added to the substrate for calibration of the detectors. The wires or strings of pellets are placed in different regions of the reactors where the power distribution and fuel breeding are to be measured.

BRIEF DESCRIPTION OF THE DRAWINGS

For a better understanding of the invention, reference may be had to the exemplary embodiment shown in the accompanying drawings in which:

FIG. 5 is a schematic diagram of an operational system immplementing the instant invention; and FIG. 6 is a schematic diagram of the liquid sodium separator illustrated in FIG. 5.

DESCRIPTION OF THE PREFERRED EMBODIMENT

Figure 1:
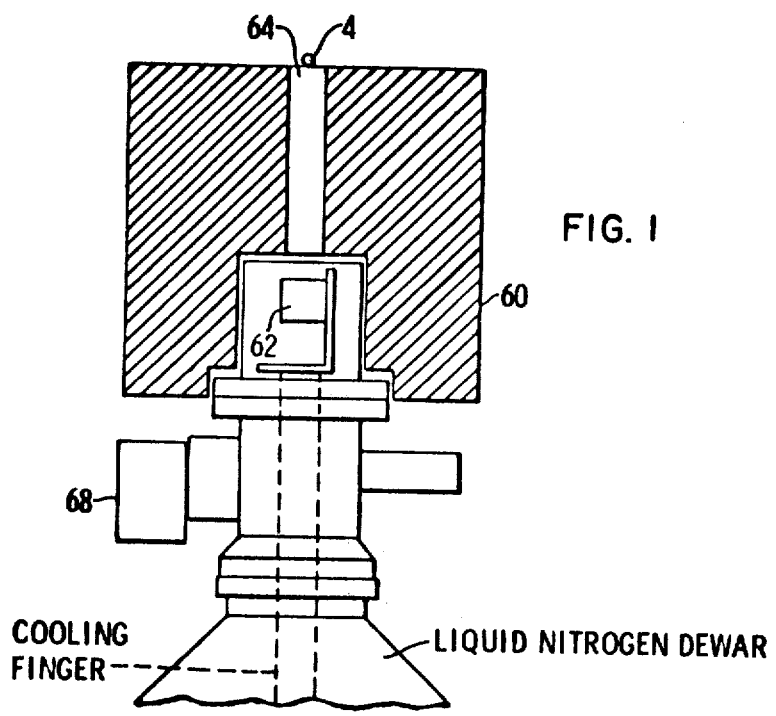
FIG. 1 is a schematic view of the counter assembly used in conjunction with this invention.

In order to operate a fast breeder reactor in the safest and most economical way, it is desirable to know the in-core power and breeding distributions at all times. Ideally, the power distribution could be determined by inserting continuously recording monitors, such as miniature fission chambers, at many points within the reactor. However, the operating environment in a fast breeder is extremely hostile, due to the high temperatures and intense gammaray and neutron fields which are encountered. Presently, available fission chambers cannot operate effectively in this environment. Furthermore, it would not be possible to accurately determine the breeding distribution within the reactor using these devices.

In order to obtain the aforementioned information, an activation system has been developd to measure both the power and breeding distributions within the fast breeder reactor. In practice, the activation system uses detectors in the form of small pellets or wires. A number of these detectors are introduced into a series of columnar tubes running longitudinally through the various parts of the reactor. Following a short period of neutron activation, the detectors are removed and their radioactivity counted.

The present embodiment illustrates the use of such a system in a fast breeder reactor. In accordance with this invention, an activation detector is employed comprising both fissile and fertile materials such as $U^{235}$ and $U^{238}$ respectively, embedded in a suitable substrate such as BeO, Nb, Ta or Cr. The substrate provides the solid mechanical structure in which the activant is embedded. In order to preserve the structural strength of the detectors, it is desirable to introduce as little activant as possible. Furthermore, as repeated power and breeding distribution measurements are made, the detectors will be used over and over and the long lived activity from previous bombardments will gradually build up and interfere with the radiation measurements or counts from the most recent activation. In order to minimize the ratio of this background to primary activity, the amount of activant per detector and the irradiation time should be kept as small as possible. This is necessitated by the fact thaat the counting rate is limited by the maximum counting rate of the counter used to make the radiation measurements. Thus detectors with a greater amount of uranium or those suffering a longer bombardment time have a larger residual background, but are still limited to the same primary counting rate as those detectors with smaller values of these parameters. The difference is that in the former case a longer wait is necessary between irradiations until the background activity dies down to an acceptable level; that is a level where the background radiation does not interfere with the counts from the most recent bombardment. Conversely, the density of activants per detector has to be kept above a certain minimum because of the finite loading and unloading times of the detectors otherwise corrections will be required for the difference in the length of bombardment suffered by the first and last detectors in each channel. The longer the irradiation, the smaller the correction, so the bombardment time should be made as large as possible, without violating the other requirements. Therefore, the irradiation time and activant density selected below for this illustrative embodiment will be a compromise satisfying these three separate requirements.

As mentioned previously the activants comprise a mixture of fissile and fertile materials. The gamma-rays from the $(n,f)$ reaction in the fissile materials are used to determine the local power density while the characteristic radiation from $Np^{239}$ which results from a series of reactions following neutron capture in the fertile materials is used to determine the local breeding rate. The capture cross-section of these activants varies with the energy of the incoming particle and generally peaks in one or more energy ranges. The composition of the mixture of activants is chosen so that the energy dependence of its neutron interaction probability simulates as well as possible, that of the fuel. By a simulated neutron interaction probability it is meant that the capture cross-section of the mixture will have approximately the same statistical probability of capture, at the energy levels of the activity of interest, as that of the fuel. The energy levels of the activity of interest are those levels to be counted, which will be more fully described hereinafter. In this illustrative example of the invention, one-sixteenth inch in diameter detectors are used comprising fertile and fission materials of $U^{238}$ and $U^{235}$ respectively in a ratio of 8.5 to 1 amounting to approximately 1 milligram of the activant mixture per detector. The aforementioned values are hereinafter used because they most nearly approximate the fuel presently under consideration for breeder reactors. Of course, it is to be understood that this invention is not limited to these values and that the activants will vary in accordance with the aforementioned criteria depending upon the composition of the fuel in the breeder in which the invention is employed. Accordingly, the detectors may include other fissile materials such as $U^{233}$ and $Pu^{241}$ and fertile materials such as $Th^{232}$. This invention further contemplates the use of other fissile nuclides such as $Ni^{64}$ and fused quartz such as $Si^{30}$, as activants.

As mentioned previously the detectors are connected from a suitable substrate which is a strong, high temperature material which contributes very little interfering radioactivity to the detectors. BeO is such a material and will be used in this example as the substrate in which the activant is embedded. Other examples of substrates which will perform the same function are Nb, Ta and Cr.

In order to make a refined determination of the breeding and power distribution the uranium content of the detectors should be determined before they are introduced into the reactor for irradiation. This may be accomplished by measuring the natural uranium activity of the detectors (or a very small amount of a known radioactive material such as $Cs^{137}$ may be added to the substrate for this purpose) with a 1 × 1 inch NaI (Tl) counter. This calibration measurement may then be used as a standard against which the breeding and power determination are made. This makes it necessary to keep the detectors in the same order throughout their useful lives.

For the actual irradiation a plurality of detectors are introduced into a series of columnar tubes running longitudinally through various parts of the reactor. These tubes or conduits may be constructed out of stainless steel and have an internal diameter which closely approximates the diameter of the detectors. The height of the detectors within each column is arranged so as to be coextensive with the height of the fuel.

In present day thermal reactor systems that use a neutron activation system for flux mapping such as the system described in the aforementioned Wiesemann et al. patent, the detectors are driven in and out of the reactor with a pressurized gas. There are two reasons why a transfer fluid of this sort is undesirable in a breeder. First, the repercussions of accidentally introducing a void into the reactor coolant is so severe that extreme mechanical precautions against this possibility would be required. In addition, the gamma heating of the detectors could be so severe that a gas medium would not be able to provide adequate cooling for them. This invention resolves these problems by using a liquid transfer fluid instead of a gas. As in the case of the substrate, this material would have to retain its chemical stability at high temperatures and be free of interfering induced radioactivities. Bi and Na are examples of such a fluid and Na will be used in this embodiment as the transfer medium. The use of a dense fluid such as this provides the additional advantage of moderating the impact between detectors when they are being transferred into and out of the reactor.

After a short period of irradiation the detectors are transferred out of the reactor and stored in separate channels in order to maintain their original order. As mentioned previously, the actual period of irradiation will be limited by the density of the activants per detector and the counting limitation of the counter used to make the radiation measurements. In this example a 25 $cm^3$ Ge(Li) counter is illustrated which possesses an efficiency of 3 percent relative to a 3 × 3 inch NaI(Tl) at 25 cm. The counter 62 is surrounded by a lead shield 60, as shown in FIG. 1, containing a 1 inch diameter 5.5 inch deep hole 64 through which the radiation from the detectors 4 reach the counter. A Ge(Li) counter with a fast amplifier 68 is capable of handling about 25,000 CPS without noticeable losses. Therefore, in accordance with the limitations of the components illustrated in this exemplary embodiment, a 5 minute irradiation time is used. Of course, this irradiation period is only illustrative of this embodiment and the invention is not limited to this value but only to the aforementioned criteria which was used to set it.

After the detectors are removed from the reactor, following irradiation, the activity from the fission products produced by the (n,f) reaction is counted first, counting mostly the delayed gamma-rays to determine the power distribution. After the activity from the fission products has decayed to a low level, the activity of $Np^{239}$ or $Pa^{233}$ produced by the

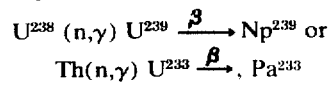

reaction is counted to determine the desired breeding information.

In this illustrative example, the power density determination is described by measuring the fission gamma rays from $U^{235}$ and $U^{238}$ while the breeding rate determination is illustrated by measuring the activity from $Np^{239}$. In order to appreciate the procedures involved in making the power and breeding measurements it is necessary to understand the neutron activated spectra of the fissile and fertile materials employed and the time delay properties of their activity. For this purpose, FIGS. 2A and 2B and FIGS. 3A and 3B illustrate the neutron activated spectra taken with a Ge(Li) counter of the activity which resulted from the bombardment of 1 milligram samples of natural uranium (99.28% $U^{238}$, 0.72% $U^{235}$) and enriched uranium (93.2% $U^{235}$ by a thermal flux of 6 ×$10^{12}$ $n$ $cm^{-2}$ $sec^{-1}$. Because of the large thermal neutron cross-section of $U^{235}$, the natural uranium sample produced about the same ratio of Np to fission activity as would be expected from the exposure of a combined $U^{235}$ -$U^{238}$ detector to a breeder spectra. The data from the $U^{235}$ sample is used to determine which lines from the natural uranium belong to Np and also provides a more refined indication of the amount of fission background under each of the Np peaks as will be more fully described hereinafter.

Figures 2A, 2B:
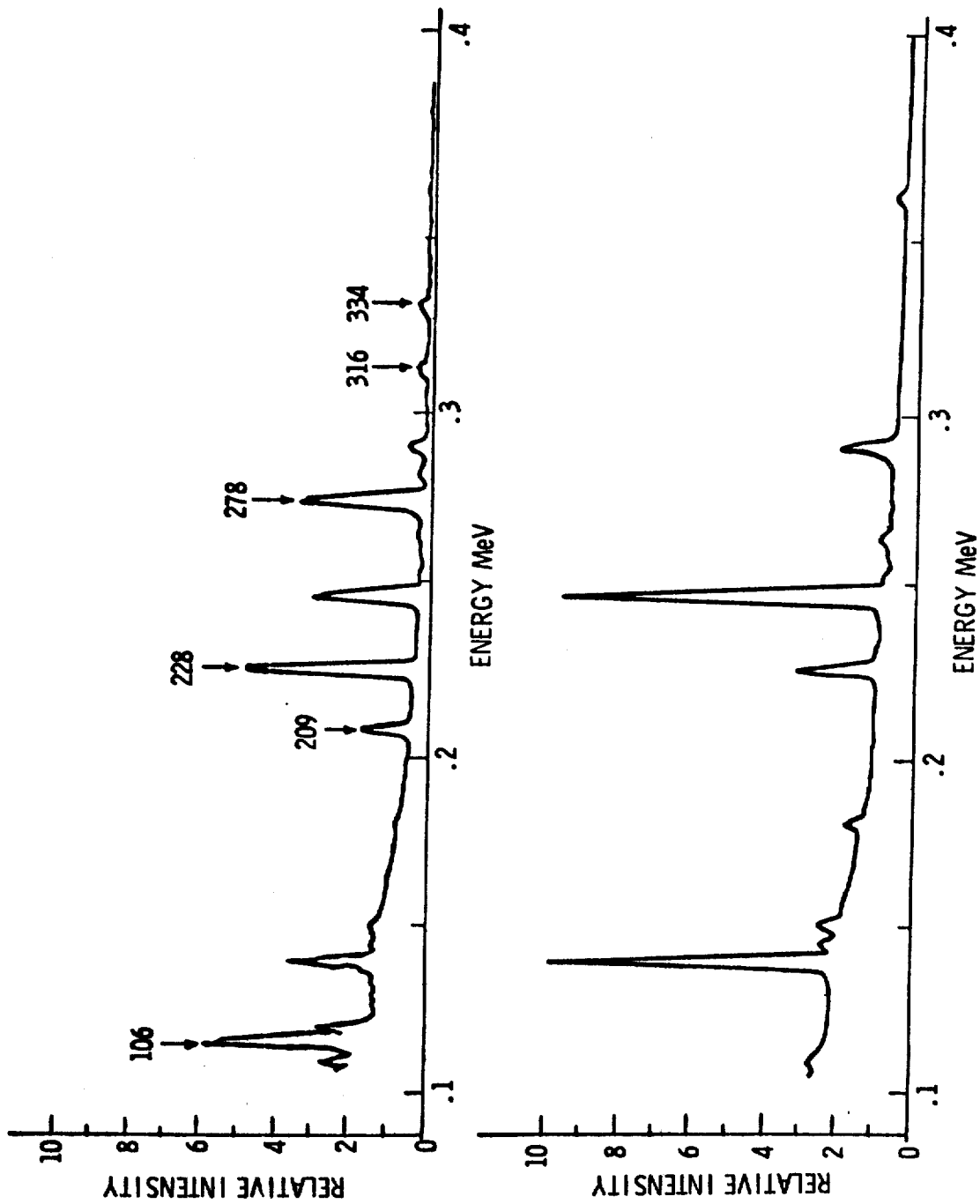
FIGS 2A and 2B are graphical illustrations of the fission gamma ray energy spectra of natural uranium and enriched uranium respectively, 24 hours after irradiation.
Figure 3A:
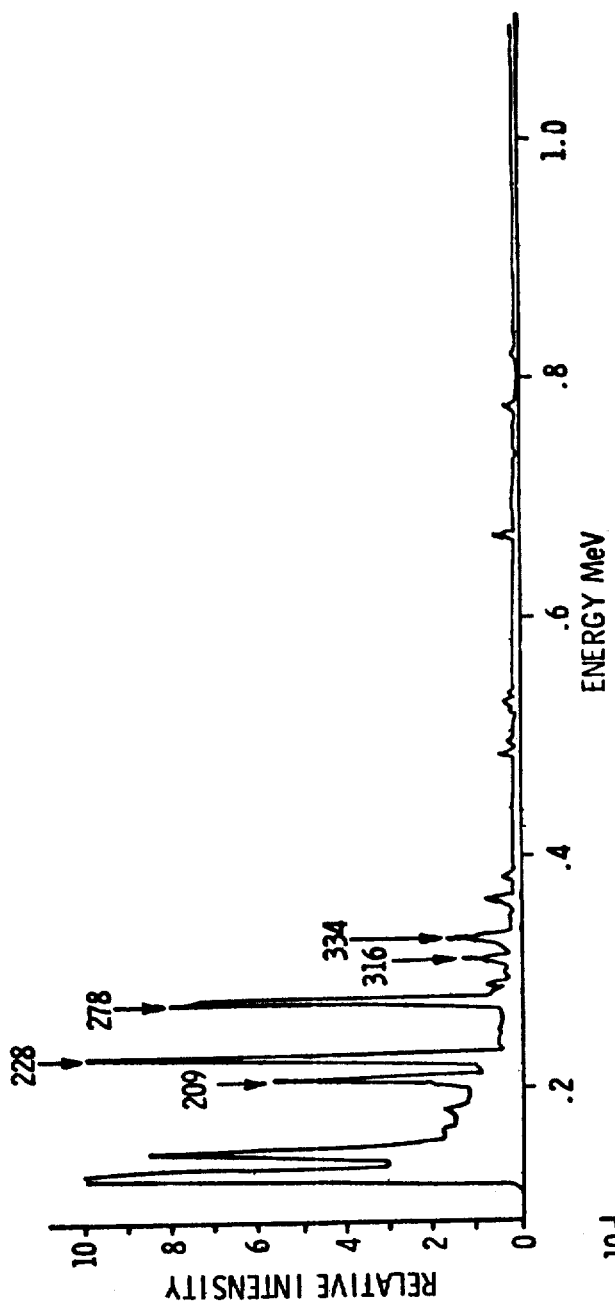
FIGS. 3A and 3B are graphical illustrations of the fission gamma ray energy spectra of natural uranium and enriched uranium respectively, 100 hours after irradiation.
Figure 3B:
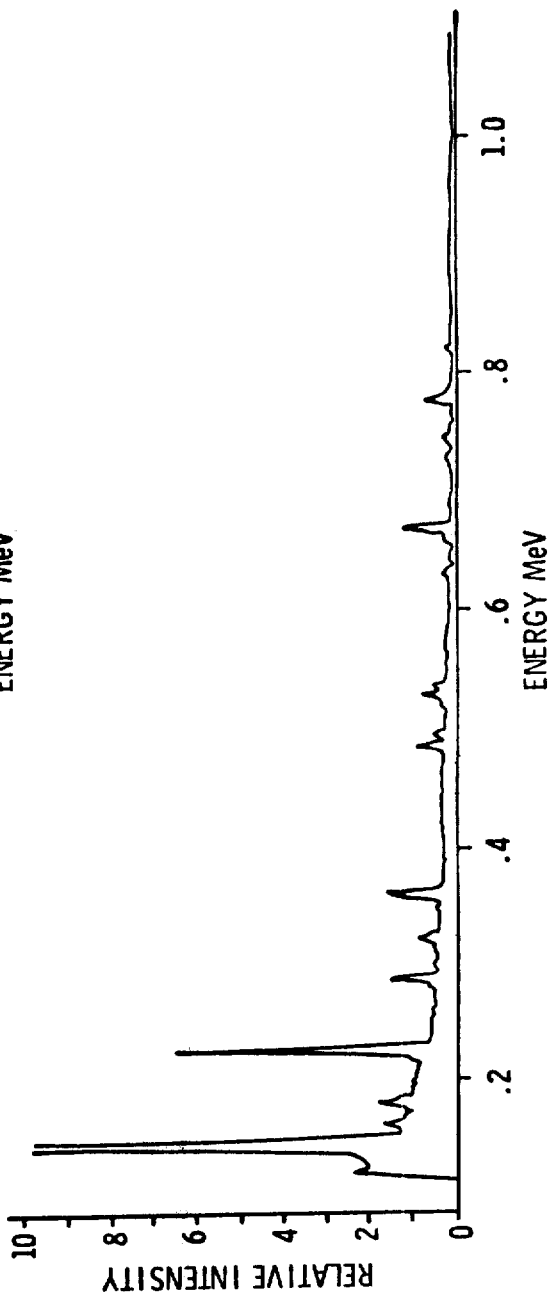

FIGS. 2A and 2B show a comparison of the natural and enriched uranium spectra 24 hours after bombardment. FIGS. 3A and 3B show the same comparison 100 hours later, on different energy scales. From these figures it will be seen that the lines attributable to the $Np^{239}$ activity are those at 106, 209, 228, 278, 315 and 235 KeV. The discriminator setting of the counter for counting the fission gamma rays has to be set above the highest energy Np peak. From these figures it will be observed that 0.4 MeV is satisfactory. Therefore, with respect to the specific activants chosen as an example of this invention the delayed gamma rays above the 0.4 MeV energy level is the activity of interest and the counts in this energy range are used to determine the power distribution. The most basic requirement of this system is that the data obtained have good statistical accuracy and map the power and breeding with an accurate spatial resolution. Because of the relatively long mean free path of the fast neutrons in a breeder reactor, a spatial resolution of 1 inch is adequate for this system. Thus, for the one-sixteenth inch diameter detectors illustrated in this example, the system is arranged to count 16 detectors one integration time and then more to the next 16, or as an alternative the detector may be continuously moved passed the counter. If the latter arrangement is utilized then the product $$m = 16$$

must be satisfied; where $\tau$ is the integration time and $n$ is the number of detectors/sec. passing the counter. This latter arrangement is preferable and is used in this example since it provides statistical advantages and is more easily incorporated into an on-line system. With a 5 percent statistical accuracy requirement set for this example an 8 second integration time is used. Therefore, the detectors pass the counter at the rate of two per second. Because of the maximum permissable counting rate of 25,000 CPS of the Ge(Li) counter used in this example, the density of activants per detector and the five minute irradiation time herein specified, the detectors will have to be stored for approximately 15 hours to allow for their associative radioactive decay before the first power measurements can be made. It is to be understood that these values are limitations of the specific components chosen to illustrate a working embodiment of this invention and are not limitations of the invention practiced thereby and hereinafter claimed.

In order to obtain the breeding measurements desired, it is necessary to determine: (1) which Np line is the most suitable to count; and (2) how long a delay following bombardment is required for the fission background under this peak to be a minimum. The reason that a minimum occurs is that the Np decays exponentially while the compton background does not, since it consists of contributions froom many fission gamma rays of different half lives.

Referring back to FIGS. 2A and 2B and FIGS. 3A and 3B it can be observed that with reference to the specific activants illustrated in this example the most prominent Np lines occur at 228 and 278 KeV. However, the former lies at the same energy level as one of the fission lines and so cannot be used. Thus, the activity of interest with respect to the breeding measurements, lies at the 278 KeV energy level. Therefore, in order to determine the breeding measurement the detectors are counted again and the pulses from the Ge(Li) counter are fed into a single channel analyzer, set on the 278 KeV Np$^{239}$ photopeak; such instruments are well known in the art and are readily available. The counting speed is again about 2 detectors per second.

Figure 4:
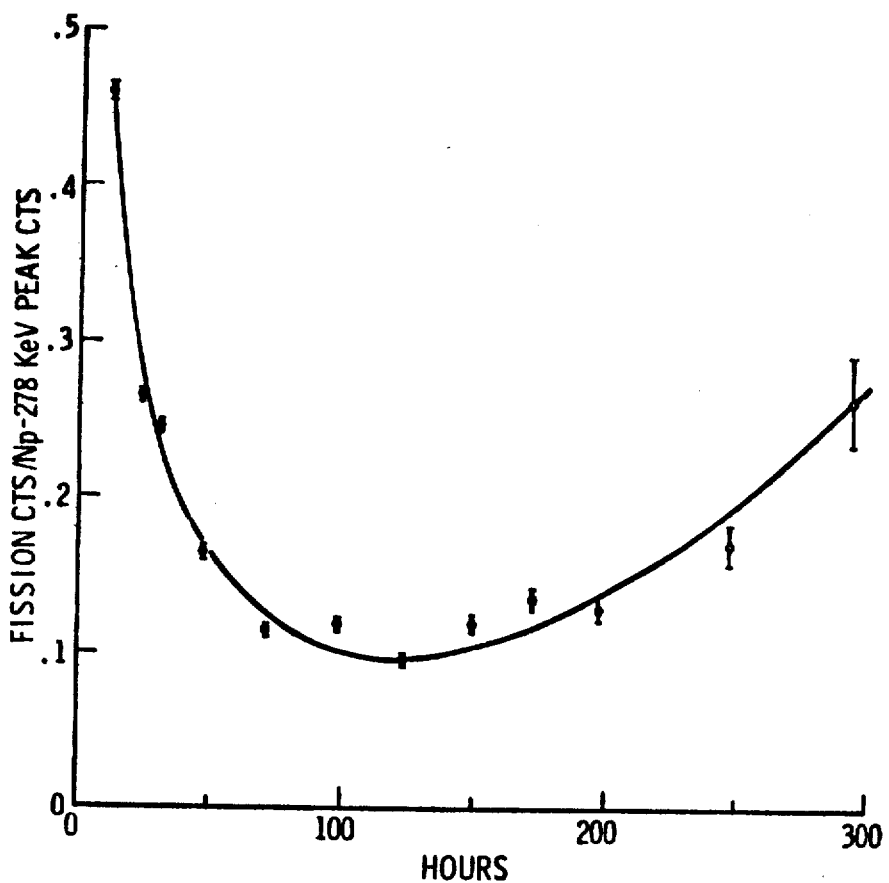
FIG. 4 is a graphical illustration of the ratio of the fission background to the number of counts under the $Np^{239}$ 278KeV peak as a function of time.

A period of storage has to be provided before these breeding measurements can be made, so that the delayed gamma rays used to determine the power distribution measurements can decay to a negligible level. FIG. 4 graphically illustrates the fission background under the 278 KeV peak in a U$^{235}$-U$^{238}$ detector as a function of time. It can be observed from this figure that the contribution of the fission background reaches a minimum of about 9.5 percent at about 100 hours after bombardment and does not increase until after 150 hours. Thus, any convenient time within this interval can be used to monitor the amount of Np formed. For a more accurate measurement, the contribution from the fission gamma rays can be remeasured and subtracted from the observed Np counts.

Again it is to be understood that the specified values ascertained and the specific procedures hereinbefore described to ascertain those values are limited to the materials illustrated as being exemplary of this invention and are not meant to be limitative thereof. The specific materials used to practice this invention in specific applications will vary in accordance with the composition of the fuel employed. Accordingly the procedures employed to ascertain those values will vary in accordance with the specific activants used.

From the data obtained in the two counting cycles, one can deduce both the power and breeding distributions with the aid of a computer. Such mathematical techniques are well known in the art and have been previously employed with reference to the neutron activation system disclosed in the aforementioned R. A. Wiesemann et al. patent for measuring the power distribution in thermal reactors. With respect to the breeding distribution, the series of reactions involved in breeding are as follows:

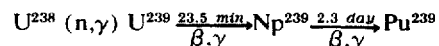

The amount of U$^{238}$ bred into Pu$^{239}$ per unit volume in the reactor at position $r$, may be expressed as:

$$B(r) = Nb(r) \sum_E \phi(E,r) \sigma_c(E)$$

where $N_b(r)$ is the number of U$^{238}$ atoms per unit volume in the fuel elements at position $r$, $\sigma_c(E)$ is the neutron capture cross-section of U$^{238}$.

$\phi(E,r)$ is the neutron flux per unit energy level at position $r$.

The U$^{238}$ which is present in the detector undergoes the same reaction and so a measurement of the Np$^{239}$ gamma rays which result from the decay of U$^{239}$ provides an experimental measurement of the breeding ratio. By using the equation for the induced activity remaining in the activant at time $t$ after a bombardment of duration T given by:

$$A(r,t) = Nda\, F(T,t) \sum_O^E \phi(r,E)\, \sigma d(E)\, dE$$

where:

$N_d$ is the number of activant nuclei present in the detector, $a$ is the number of $\gamma$-rays or $\beta$-rays of interest enriched per fission of per disintegration of the radioactive nuclide formed, $F(T,t)$ is a function depending on the bombardment time, working time, and the decay characteristics of the radioactive nuclide formed, $\sigma_d(E)$ is the neutron cross-section of the detecting reaction.

Setting $\sigma_d(E)$ equal to $\sigma_c(E)$ the expression for the experimentally measured breeding ratio at position $r$ can be given by:

$$\frac{B(r)}{B(O)} = \frac{N_b(r)}{N_b(O)} \frac{A'(r)}{A'(O)}$$

(0 refers to an arbitrary reference position, such as center of the reactor core), where $A'(r)/A'(O)$ refers to the measurement of Np gamma rays from the detector.

Since $N_b(r)/N_b(O)$ is well known when the reactor is first started up and since $A'(r)/A'(O)$ can be measured accurately as hereinbefore described, the breeding ratio can be determined with minimal error. thus by using the detectors described herein the power and breeding distributions can be determined with one bombardment cycle.

As an alternative, although a less accurate one, it is possible to determine the breeding distribution from the activation measurements used to determine the power distribution. In that case, the breeding ratio is determined from the equation:

$$\frac{B(r)}{B(O)} = \frac{A(r)}{A(O)} \left[ \frac{\sum_E \phi(E,O) \sigma_d(E)}{\sum_E \phi(E,r) \sigma_d(E)} \times \frac{N_b(r) \sum_E \phi(E,r) \sigma_c(E)}{N_b(O) \sum_E \phi(E,O) \sigma_c(E)} \right]$$

The weakness of this method is that the match between $\sigma_c(E)$ and $\sigma_d(E)$ will not be particularly accurate since the detector is chosen primarily to match the fission cross-section of the fuel. This means that the breeding ratio determined in this manner will not possess the accuracy of the power ratio because of the less complete cancellation or errors in $\phi$ which results. Nevertheless, the application of this equation does not provide a means of determining the breeding distribution using one counting cycle.

The mechanics for implementing such an activation system as described herein already exist and may be found in the R. A. Wiesemann et al. patent which is intentionally incorporated by reference herein. The mechanics of that system are sufficient to implement the present system except for those changes specified herein, which include a separate delay and counting cycle for measuring the activated fission products and those end products which result from the neutron activation of the fertile material.

Operation of the Disclosed Neutron Activation System

Referring now to FIG. 5 of the drawings, an operational explanation of an explanation of an exemplary system employing this invention is given. the detectors 4 are initially stored in the storage coils or portholes 2, three such portholes being employed in this example. To load the detectors 4 into the reactor 5 the valve 8 is closed and valve 6 is opened to communicably couple the dispenser 10 with conduit 7. The valve 3 is moved to communicably couple one of the portholes 2 to the detector dispenser 10. The detector dispenser 10 is then opened and the detectors 4 move into conduit 7 between valves 6 and 8 by gravity feed until the first porthole coupled by valve 3 is emptied. Then valve 6 is moved to cause communication between conduits 9 and 7, valve 12 is moved to communicably couple the sodium supply tank 24 to conduits 9 and 7, and valves 8 and 14 are opened to pass the detectors into a predetermined irradiation spindle 16 through valve 15. The pressurized liquid sodium drives the detectors 4 in conduit 7 into the reactor spindle 16 coupled by valve 15. The reactor 5 is provided with a number of like spindles 16 equal to the number of portholes 2. This process is then sequentially repeated for each of the portholes 2 so as to fill each of the reactor spindles 16 in substantially the same manner. The valve 3 is provided to connect the next porthole 2 to the detector dispenser 10 when all the detectors 4 from the preceding porthole 2 are loaded into the corresponding spindle 16. Similarly, valve 15 is provided to sequentially connect the next spindle 16 after the preceding spindle 16 has been filled. Each porthole 2 contains enough detectors 4 to fill its respective spindle 16 to a height coextensive with the height of the reactive region 11.

After the required period of irradiation, valve 14 is moved to couple the spindle 16 with the sodium separator 18 (to be described) and valve 12 is moved to couple the sodium supply tank 24 with the spindle 16. The pressurized sodium from the sodium tank 4 passes into the lower portion of the spindle 16 communicably coupled to valve 15 through a small conduit network associated with each spindle and running coextensive therewith. When valve 15 is moved to couple a particular spindle 16 to valve 14 it also couples the conduit network associated therewith to the sodium conduit 17 so that the pressurized sodium can drive the detectors in that spindle 16 out of the reactor. Valve 15 is sequentially positioned so that the detector 4 can be driven out of the reactor 5 and into the sodium separator 18 in the same columnar order as they were introduced into the reactor. Valve 22 is then closed and valve 20 is moved to communicably couple the sodium separator exit conduit 58 with conduit 13. The detectors 4 exiting from the sodium separator 18 then falls into the conduit 13 by gravity feed. Conduit 13 is desirably constructed so that its height is coextensive with the height of the detectors 4 in each spindle 16. The separated sodium exiting from the sodium separator is stored in reservoir 70 until the reactive sodium decays and can be returned to the sodium tank 24 via conduit 72 and sodium pump 74. When conduit 13 is filled, valve 20 is positioned to close the exit conduit 58 and couple the air supply 26 to conduit 13 via air conduit 25. Then valve 22 is opened so that the pressurized air from the air supply 26 drives the counting storage coils 28 via conduit 19 and valve 27. Valve 27 is provided to sequentially couple the respective storage coil 28 to be filled, with conduit 19. After each storage coil 28 is filled valve 27 is moved to communicably couple the next coil 28 within conduit 19 and the sequence of filling and emptying conduit 13 is repeated until all the detectors 4 are stored in the coils 28 in accordance with the array originally established in the portholes 2.

Prior to detecting the radiation counts for making the power measurement, the detector dispenser 30 is closed and the dispensers 32 are sequentially opened to fill the counting conduit 34 with the detectors 4 in the same order in which they were introduced into the coils 28. The counting process consists of noting the counting rate from the counter 36 as the detectors are passed one at a time by the double dispenser 30. The counter will see 16 detectors at a time and count for one-half second as previously described in this embodiment. The line of detectors is then sequentially advanced by one in the manner just described and another ½ second integration is made. While this process is occurring valve 38 is moved to pass the detectors 4 exiting from dispenser 30 into conduit 39 while valve 40 is closed. Therefore, as each detector is passed through the dispenser 30 it will fall by gravity feed into conduit 39. Conduit 39 is desirably constructed so that its height is coextensive with the height of conduit 13. When conduit 39 is filled valve 38 is positioned to close the dispenser exit conduit 37 and couple the air supply 26 via air conduits 35 and 25. Then valve 40 is opened to couple conduit 39 with recycle conduit 21. The pressurized air from air supply 26 then drives the detectors 4 from conduit 39 through recycle conduit 21 to the storage coils 28 via valve 27 which is positioned to couple conduit 21 with the respective coil 28 being filled. After each storage coil 28 is filled valve 27 is moved to communicably couple the next coil 28 with recycle conduit 21 and the sequence of filling and emptying conduit 39 is repeated until all the detectors 4 are again stored in the coils 28 in accordance with their original array and the power measurement is complete. While this sequence is recurring and during the interim that valve 38 is closed the detectors 4 that are being continually dispensed by dispenser 30 are stored in conduit 37 until valve 38 is again opened to pass them into conduit 39.

The aforementioned process is repeated after the specified time for decay in order to make the breeding measurement; except that during the sequence of emptying conduit 39 valve 40 is positioned to couple reload conduit 43 so that the pressurized air from air supply 26 drives the detectors back into their respective portholes 2 via valve 41. After each porthole 2 is filled valve 41 is moved to communicably couple the next porthole 2 with reload conduit 43 and the sequence of filling and emptying conduit 39 is repeated until all the detectors 4 are again stored in the portholes 2 in accordance with their original array and the breeding measurement is complete.

The liquid sodium separator 18 described with reference to FIG. 5 is illustrated in detail in FIG. 6. The exposed detectors 4 and the sodium transporting medium, which has now become radioactive, enter the sodium separator 18 through input conduit 42. After the highest point 44 is reached, the detectors 4 roll down the separation conduit 46 over a fine mesh screen 48. The radioactive liquid sodium drains through the mesh 48 into a catch basin 50. At the same time, nonradioactive liquid sodium 52 enters from the top and passes vertically through the conduit 54 into the basin 50 and washes any adherent radioactive sodium from the detectors 4. The sodium collected in the basin 50 is drained through conduit 56 into the sodium reservoir 70 where it is allowed to decay. After the sodium has decayed to an acceptable level it is returned to the sodium tank 24, illustrated in FIG. 5, via sodium pump 74 and conduit 72. The detectors 4 pass through the separator 18 by gravity feed and travel through the exit conduit 58 and valve 20 to the conduit 13 illustrated in FIG. 5. The conduits, valves and dispensers set forth in this embodiment are well known in the art and a more detailed showing of their structure and operation may be found in the R.A. Wiesemann et al. patent. The conduits employed in this example may be made of stainless steel and have an internal diameter which closely approximates the diameter of the detectors as hereinbefore described. The air tubing may be made of steel, aluminum, or other compatible metals or plastics and the sodium tubing can be made of steel or any other compatible material as will readily be recognized by those skilled in the art.

After the detectors 4 are returned to their initial array in the portholes 2 as previously described with reference to FIG. 5, and a period of storage is provided for to allow for their decay, this procedure may be repeated to provide successive breeding and power determinations. Because of the buildup of residual activity from previous bombardments under the fission activity from the most recent irradiation it is desirable to use five sets of detectors cyclically. If a set of detectors is used once a month for 5 years the residual activity at the end of that period will amount to 15 percent of the primary counting rate measured twenty hours after the last bombardment, while if five sets of detectors are used cyclically this level could be reduced to less than 1 percent.

It will, therefore, be apparent that there has been disclosed a neutron activation system which permits the determination of the neutron flux mapping and fuel breeding in a fast breeder reactor. This system is efficient, flexible and economical.

While there have been shown and described what are at present considered to be the preferred embodiments of this invention, modifications thereto will readily occur to those skilled in the art. For example, the sequence of valve operations can be altered, the detectors can be arranged to pass by the counter on a turntable or the counting conduits can remain fixed while the counter assembly is made movable so that the counter assembly moves over the counting conduit to determine the activation of the detectors within the conduit. Alternatively, the counter assembly can be mounted on a trunnion so as to be rotatable. The counting conduit can then be circular in shape and held in a fixed position with the counter assembly mounted in the center of the conduit. The counter assembly is then rotated within the circular conduit at a constant speed to determine the activation of the detectors within the conduit.

It should also be noted that this system may be used to measure breeding alone, in which case the detectors need only contain the fertile material from which the Np counts are made. Alternatively, the power density measurements may be made separately, in which case the detectors need only contain fissionable material.

We claim as our invention:

1. Apparatus for measuring the breeding distribution within a liquid metal cooled fast breeder power reactor having a fuel inventory including fertile material, said apparatus comprising a plurality of detectors formed in part from neutron flux sensitive fertile material, said flux sensitive material having substantially the same energy dependence of its neutron interaction probability as the fertile material in said fuel inventory, means for inserting and distributing said detectors within said reactor in a predetermined arrangement so as to be activated by said reactor, means for withdrawing said detectors from said reactor, wherein said inserting means and withdrawing means employ a liquid transfer medium compatible with the reactor coolant to drive said detectors and means for measuring in conformance with said arrangement the radiation emitted from the end products produced by the activation of sensitive fertile material.

2. The apparatus of claim 1 wherein said flux sensitive material is embedded in a substrate.

3. The apparatus of claim 2 wherein said substrate material is selected from the group consisting of BeO, Nb, Ta, and Cr.

4. The apparatus of claim 1 wherein said flux sensitive fertile material is selected from the group consisting of $U^{238}$ and $Th^{232}$.

5. The apparatus of claim 1 wherein said flux sensitive material comprises $U^{238}$ and said end products from which said radiation measurements are made comprise $Np^{239}$.

6. The apparatus of claim 1 wherein said flux sensitive material comprises $Th^{232}$ and said end products from which said irradiation measurements are made comprise $Pa^{233}$.

7. The apparatus of claim 1 wherein said means for inserting and distributing said flux sensitive material within said reactor and said means for withdrawing said flux sensitive material from said reactor comprises conduit means extending into and out of said reactor employing the liquid transfer medium for transporting said detectors through said conduit means into and out of said reactor in an orderly sequence.

8. The apparatus of claim 7 wherein the liquid transfer medium employed for transporting said detectors through said conduit means comprises a driving fluid selected from the group consisting of Bi and Na.

9. The apparatus of claim 1 for measuring both the power and breeding distribution within a fast breeder reactor wherein said detectors further comprise flux sensitive fissile material including means for measuring in conformance with said arrangement the radioactivity emitted from the activation of said flux sensitive fissile material.

10. The apparatus of claim 1 wherein said detector material is a fertile material selected from the group consisting fo nichrome and fused quartz.

11. The apparatus of claim 9 wherein said flux sensitive fissile material is selected from the group consisting of $U^{235}$, $U^{233}$ and $Pu^{241}$.

12. The method of determining the breeding distribution within a liquid metal cooled fast breeder power reactor having a fuel inventory including fertile material, comprising the steps of arranging a plurality of detectors formed in part from fertile material in a predetermined array, transporting said detectors in said array using a liquid transfer medium compatible with the reactor coolant to drive said detectors into a reactor core so that said detectors in said reactor core conform to said array, irradiating said detectors in said reactor core for a predetermined period of time, transporting said detectors using the liquid transfer medium from said reactor core to a radiation measuring station, and measuring each of said detectors in said array for the radioactivity emitted from the end products produced by the activation of the fertile material therein.

13. Thee method of claim 12 wherein the power distribution within the fast breeder reactor is also determined from the single irradiation of the detectors, said detectors formed at least in part from both fertile and fissile material including the additional steps of measuring each of said detectors in said array for the radiation emitted from said fissile material to determine the source distribution within said reactor and storing said detectors prior to measuring the activity from said fertile end products until the radioactivity from the fission products has decayed to a relatively low level.

14. The method of determining the breeding distribution within a liquid metal cooled fast breeder power reactor having a fuel inventory comprising fertile material, comprising the steps of arranging a plurality of detectors comprising fissile material in a predetermined array, transporting said detectors in said array using a liquid transfer medium compatible with the reactor coolant to drive said detectors into a reactor core so that said detectors in said reactor core conform to said array, irradiating the fissile material in said detector in said reactor core for a predetermined period of time, transporting said detectors using the liquid transfer medium from said reactor core to a radiation station, and measuring the induced radiation emitted from the end products formed from the activation of each of said detectors in said array.

* * * * *